United States Patent [19]
Cohn et al.

[11] Patent Number: 5,901,308
[45] Date of Patent: * May 4, 1999

[54] SOFTWARE MECHANISM FOR REDUCING EXCEPTIONS GENERATED BY SPECULATIVELY SCHEDULED INSTRUCTIONS

[75] Inventors: Robert Cohn, Salem, N.H.; Michael C. Adler, Wayland; Paul Geoffrey Lowney, Concord, both of Mass.

[73] Assignee: Digital Equipment Corporation, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/617,014

[22] Filed: Mar. 18, 1996

[51] Int. Cl.$^6$ .......................................................... G06F 9/00
[52] U.S. Cl. ............................................ 395/591; 395/392
[58] Field of Search .................................... 395/582, 591, 395/705, 392

[56] References Cited

U.S. PATENT DOCUMENTS

| | | | | |
|---|---|---|---|---|
| 5,421,022 | 5/1995 | McKeen et al. | ..................... | 395/800.23 |
| 5,627,981 | 5/1997 | Adler et al. | .............................. | 395/582 |
| 5,634,023 | 5/1997 | Adler et al. | .............................. | 395/591 |
| 5,655,122 | 8/1997 | Wu | .......................................... | 395/705 |

OTHER PUBLICATIONS

Thomas M. Conte et al, "Using Branch Handling Hardware to Support Profile–Driven Optimization", Dec. 1994.

Thomas M. Conte, Burzin A. Patel, and J. Stan Cox—"Using Branch Handling Hardware to Support Profile–Driven Optimization", Dec. 1994.

*Primary Examiner*—Robert B. Harrell
*Assistant Examiner*—David M. Ovedovitz
*Attorney, Agent, or Firm*—Hamilton, Brook, Smith & Reynolds, P.C.

[57] ABSTRACT

A method of compiling an application to reduce the occurrence of speculative exceptions is described. The method includes the steps of compiling the application to provide a speculation table and an executable file, and obtaining profile information about said compiled application using representative data sets. The compiler includes a scheduler unit for rearranging the order of the instructions in the application to provide optimal performance. The speculation table comprises a number of entries corresponding to the instructions of the application, each entry including a tag identifying the instruction and a semaphore indicating whether or not the instruction is likely to cause an exception. The executable file is run using a number of representative data sets to profile information identifying those instructions that result in exceptions, and the tag of the instruction is stored in a log file. After the profiling has completed, the tags of the instructions causing exceptions are used to set the semaphores in the speculation table corresponding to the tag. The application is then re-compiled. During the recompilation, those instructions with their semaphores set; i.e. those instructions causing exceptions, will not be speculatively scheduled by the compiler.

26 Claims, 3 Drawing Sheets

SOFTWARE MECHANISM FOR REDUCING EXCEPTIONS GENERATED BY SPECULATIVELY SCHEDULED INSTRUCTIONS

BACKGROUND OF THE INVENTION

This invention relates generally to the field of computer system software and more specifically to the field of compilers.

As it is known in the art, software applications that are executed on a computer system are written in a high level computer language such as FORTRAN or "C". Before the application can be executed by the computer system, it must first be translated from the high level language down to a machine executable instruction stream. A software program known as a "compiler" uses input data about the type of computer system and the type of high level language in order to translate the application into machine code capable of being executed by the computer system.

The computer system is typically comprised of a number of functional units including a decode unit, an execution unit, and a memory unit. Each machine code instruction is decoded by the decode unit to determine the type of operation to be performed by the instruction. The instructions which are capable of being decoded and executed by the computer system are known as the instruction set of the computer. Typical instructions on a Reduced Instruction Set Computer (RISC) include a LOAD instruction and a STORE instruction.

In early computer systems, each instruction in a sequence was decoded and the associated function was performed before the decode of the following instruction in the sequence. Such an arrangement ensured that each operation was complete before the start of the next and that therefore any data dependencies between instructions were always satisfied before the instruction was decoded. A drawback of this arrangement was that only one unit of the computer system was functioning at any given time interval, while the other portions remained idle. Accordingly, because the computer system was not being fully utilized, the performance of the computer system was greatly reduced.

"Pipelined" architecture was developed in an effort to maximize the utilization of the computer system. In pipelined computer systems, after one instruction in the sequence was decoded by the decode unit and passed to the execution unit, the decode unit immediately began decoding the next instruction in the sequence. With such an arrangement the decode unit, the execution unit and the memory unit could all be operating on different instructions during any given time interval.

However, pipelined architectures still must honor dependencies between instructions in a sequence. For example, if one instruction in a sequence was to LOAD R1, (R2) (which acts to load a register R1 with the contents of memory at an address designated by R2) a memory read must be performed.

If the next instruction in the sequence is ADD R1, R5 (which acts to add the contents of the two registers), the ADD instruction can not be performed until the read of memory has been completed. As a result the computer system typically stalled the execution of instructions until the dependencies between successive instructions were resolved, again reducing the overall performance of the system.

In an effort to combat the performance reduction caused by stalls, the concept of rescheduling instructions arose. Rescheduling instructions involves reordering the sequence of instructions to place one or more other instructions in the sequence between instructions having dependencies that may result in a stall. With such an arrangement, functional work may be performed in instances where previously the machine was idle and thus the performance of the computer system is improved.

Compilers that reschedule instructions typically divide the instruction sequence into groups of instructions called basic blocks. A basic block is a group of instructions having only one entry point and one exit point. All instructions in the basic block are executed before exiting from the block. Therefore, instructions in the block may be rescheduled to any location in the block to alleviate stall situations caused by dependencies between instructions in the block as long as dependencies between instructions are obeyed.

However, for computer systems capable of executing a number of instructions at a time, short basic blocks of code do not provide a sufficient number of instructions for optimal rescheduling. In order to make additional instructions available for rescheduling, an approach known as "speculative scheduling" has been developed. According to the concept of speculative scheduling, instructions following a conditional branch instruction (and thus in a different basic block) may be rescheduled to precede the branch instruction. This rescheduled instruction is referred to as a "speculative instruction." After rescheduling, the speculative instruction is situated such that it will be executed before it is determined whether or not the branch is taken, and consequently before it is determined whether or not that speculative instruction need be executed at all. If it is determined that the speculatively executed instruction did not need to be executed, the instruction is said to be "mispredicted" and its result is ignored.

One problem that occurs with speculative scheduling arises from speculatively executed instructions which cause exceptions. An exception is raised when an error is detected by the computer system, such as a reference to an invalid address. Exceptions result in an interruption of the normal processing of the instruction sequence so that the error can be repaired and the instruction causing the error replayed before processing of the instruction sequence is resumed. If a speculatively executed instruction is mispredicted, and generates an exception, then a great deal of compute time is wasted handling an exception that would not have occurred had the speculative instruction been left in its original basic block.

Both hardware and software techniques have been developed to handle speculative exceptions. One hardware technique, described in U.S. Pat. No. 5,421,022, determines that there has been an exception condition caused by a speculative instruction, but withholds the signaling of an exception to the computer system until it is determined that the speculative instruction is in fact executed.

Software techniques typically do not have the capability to defer exceptions as done in hardware. However, one software method, described in U.S. patent application Ser. No. 08/270,192, filed Jul. 1, 1994 and entitled "A Software Mechanism for Accurately Handling Exceptions Generated by Instructions Scheduled Speculatively due to Branch Elimination" defers exceptions in the following manner: Using a technique called "hardware predication", branch instructions were eliminated by applying the condition evaluated by the branch as a predicate to each instruction controlled by the branch. Each instruction controlled by the branch was encoded with the location of the instruction's associated predicate. In addition, each instruction included a semaphore for indicating whether an exception occurred during the execution of the speculative instruction. The exception handler, before executing the code to correct the exception, first checked the predicate and the semaphore of the speculative instruction. If it was determined that the speculative instruction should not have been executed, the exception handler did not proceed with the exception routine.

Thus both hardware and software techniques have been provided for correcting problems associated with speculative exceptions. However, each technique brings with it an associated overhead. The hardware technique utilizes chip area for control and pipelining of data. The software technique requires compute cycles for determining whether the exception handler need, in fact be executed, thus reducing the performance of the computer system. It is desirable to reduce the number of speculative exceptions to thereby minimize the overhead incurred by the software and hardware exception handling techniques.

SUMMARY OF THE INVENTION

According to one aspect of the invention, a method for providing an executable program includes the steps of compiling an application, the application having a stream of instructions, and executing the compiled application with a representative data set to provide profile information about the application. During the initial compilation, a translation table is generated, where the translation table includes an entry for each instruction. Each entry of the translation table identifies locations of the corresponding instruction in a memory. During execution of the compiled application with the representative data sets, instructions causing exceptions are identified, and the translation table is updated to indicate which of the individual instructions caused exceptions during execution. The profile data stored in the translation table is then used to guide the compiler during recompilation of the application to allow the compiler to make educated decisions about how to reduce the number of speculative exceptions which occur during the execution of the application. With such an arrangement, instructions likely to cause exceptions can be identified and precluded from being speculatively scheduled, thereby reducing the probability of 'mispredicted' exceptions.

BRIEF DESCRIPTION OF THE DRAWINGS

The above-mentioned and other features of the invention will now become more apparent by reference to the following description taken in connection with the accompanying drawings in which.

DESCRIPTION OF THE PREFERRED EMBODIMENT

Figure 1:
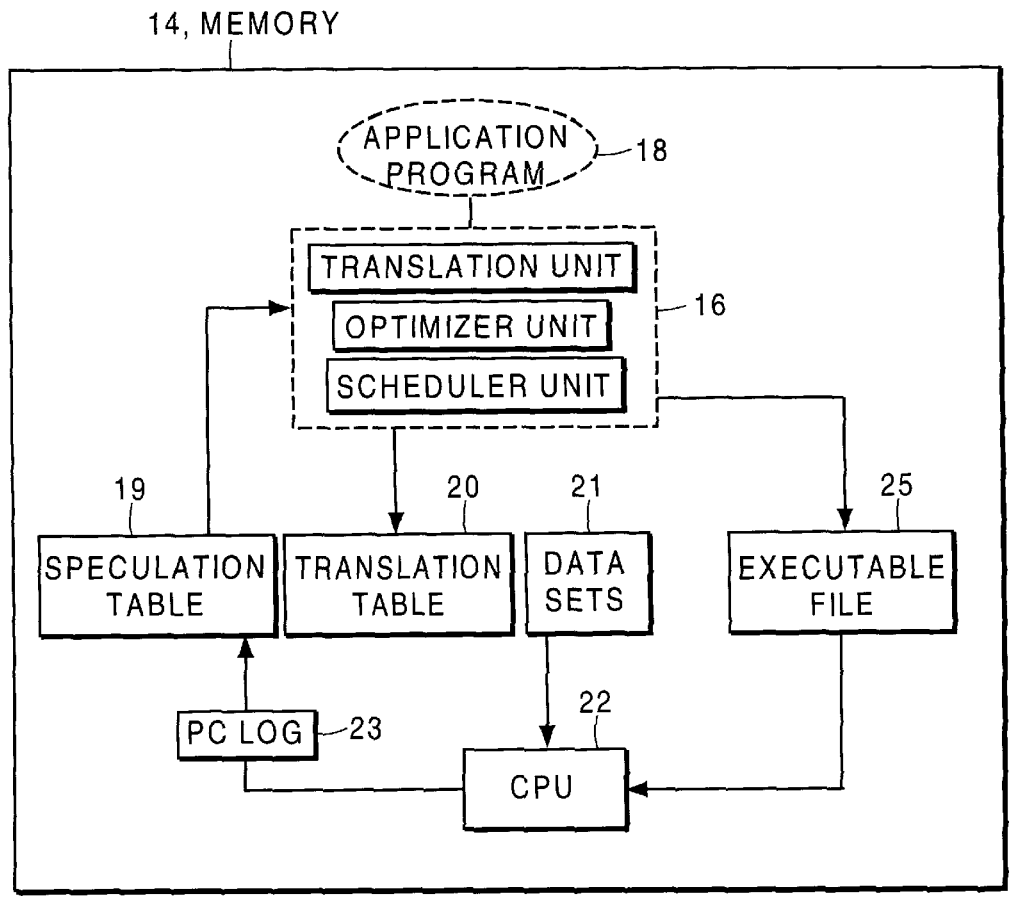
FIG. 1 is a flow diagram illustrating the functional blocks and interrelation between the blocks of a compiler designed in accordance with the present invention.

Referring now to FIG. 1, a portion of a computer system 10 according to the invention is shown to include a Central Processor Unit (CPU) 22 coupled to a memory unit 14. The CPU 22 is a processor that operates on a stream of instructions stored in memory 14. Each CPU typically includes decode logic, for determining a type of instruction, and arithmetic logic, for performing the functions dictated by the instructions. Associated with the CPU is an instruction set comprising a fixed number of instructions that are recognized by the respective CPU.

The memory unit 14 is typically comprised of dynamic RAM devices. The memory unit 14 is used for temporary storage of instructions and data for use by the CPU. In FIG. 1, the memory is shown to hold two programs indicated by dashed outlines; a compiler 16 and an application program 18. The application program is a program to be executed by the CPU, such as a graphics program, a simulation tool, a word processing program, a game or the like. Typical application programs are written in a high level language such as C, FORTRAN, or COBOL. Application programs must be translated into code that is recognizable by the decode logic of the CPU 22. Therefore the compiler requires, as input, the application program and the instruction set of the CPU. The compiler may also require other information about the CPU such as branch latencies, memory read latencies, or the number of working registers.

The compiler 16 operates on an input application program 18 to provide an executable file 25 for execution on the CPU 22. In addition, during compilation a speculation table 19 is output from the compiler 16. The speculation table 19 is further updated with data from a PC LOG file 23 that is generated by the CPU using data sets 21. The speculation table 19 and PC LOG 23 each aid in identifying instructions that may cause exceptions, and will be described in more detail later herein. The speculation table 19 is read by the compiler 16 during a second, recompilation of the application. In order to fully explain the data stored in the speculation table, a brief overview of the operation of the compiler 16 is provided below.

The compiler of FIG. 1 is shown to include 3 functional units: a translator 16a, an optimizer unit 16b and a scheduler unit 16c. The translator 16a uses information about the instruction set of the CPU to translate the application from a high level language representation into an instruction stream executable by the CPU. The translator 16a uses a parsing program, known to those of skill in the art, to read the application, and a translation mechanism to convert the recognized characters into instructions from the instruction set, thus creating an internal representation of the application program. The internal representation is stored in memory, and a tag is generated for each instruction to indicate the location of the corresponding instruction in the source program.

Although the translator is able to provide an executable instruction stream, there is no guarantee that this translated instruction stream will be able to take full advantage of the performance of the CPU. Because applications are written in a high level language, they are not designed for the particular characteristics of the CPU on which the application will be executed. Thus certain optimizations must be made to the translated instruction stream in order to improve the performance of the application on the particular CPU. Typical optimizations include loop unrolling and other methods known to those of skill in the art which need not be detailed herein. These optimizations are performed by optimizer 16b. After the optimization have been implemented, the internal representation of the application is fed to the scheduler unit 16c.

The scheduler unit 16c operates to reduce the amount of time that any portion of the CPU logic remains idle. As mentioned previously, in a pipelined architecture the functional operations of the CPU are broken down into a number of discrete operations. By way of a simplistic example, these operations may include a decode unit, an execution unit, and a memory unit. Each unit has a task associated therewith; the decode unit decodes the instruction stream, feeding variables and control to the execution unit. The execution unit may perform arithmetic functions, and may be used to calculate memory addresses. The memory unit stores and retrieves data. Associated with memory is a latency, i.e. a portion of time between when a memory request is initiated and when the data may be retrieved from the memory. If an instruction requires data from the memory unit, the entire CPU may be stalled until that data is returned. Because the CPU is not operating during a stall, it can be seen that stalls are detrimental to CPU performance.

However, not every instruction requires the use of all the functional units. Other instructions which do not require data from the memory unit may be executed while the memory unit is accommodating a request. The scheduler unit 16c rearranges the order of the instruction stream to insert other instructions before an instruction requiring memory data from a previous operation, in order to minimize the stalls. By ensuring that most of the functional units are operating at any given time interval, improved computer performance may be achieved.

For example, an instruction sequence that may result in a stall is shown below. Note that instruction 2 requires memory read data from instruction 1, and therefore is dependent upon instruction 1.

1. ID R0, (r1)
2. beq r0, L1
3. ID r2, (r3)
4. ID r4, (r5)

Figure 3C:
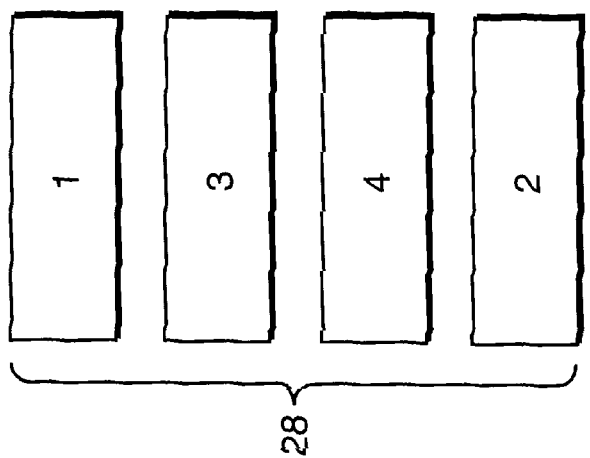
FIGS. 3A–3C illustrate rescheduling of a sequence of instructions performed by the compiler of FIG. 1.
Figure 3B:
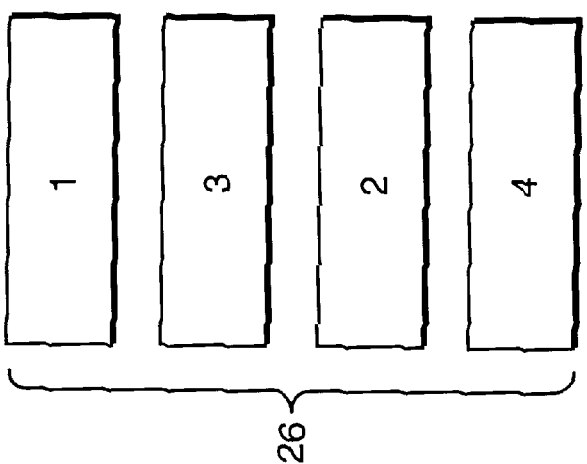
Figure 3A:
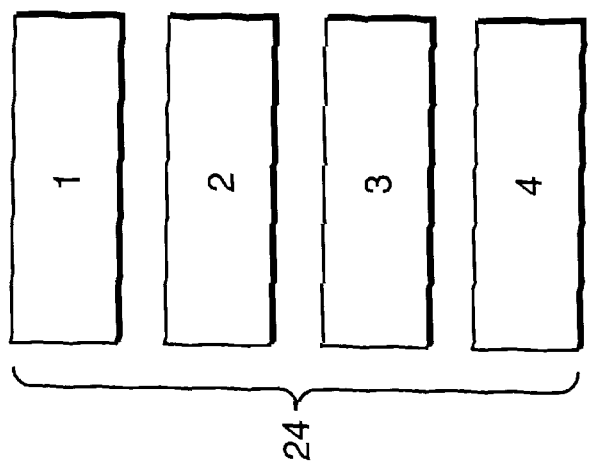

Without scheduling the above code sequence, it would flow in a sequence such as that shown as group 24 in FIG. 3A. The first instruction loads a register with the contents of a memory location designated by r1. As such, the first instruction requires a memory read to be performed. The second instruction branches, depending upon a comparison between L1 and the data returned by the read operation. As such, before the branch can be performed, the CPU must wait for the memory read to occur. Even in systems that use cached memory, a latency is incurred that results in a stall which reduces the performance of the system.

Re-scheduling of the instruction sequence may reduce the number of stalls in the computer system. Referring again to the example instruction stream shown above, by examining instructions 3 and 4 it can be seen that neither instruction requires the read data of instruction 1. The scheduler recognizes both the dependence of instruction 2 on instruction 1 and the independence of instruction 3 and rearranges the instructions as shown in FIG. 3B as group 26. The resulting instruction stream will execute instruction 3 before the branch instruction 2. Because instructions 3 has been moved before the branch instruction, it will be executed 'speculatively.'

A branch instruction may divert the flow of the instruction sequence if taken. Thus, moving an instruction succeeding a branch to a location preceding the branch results in the execution of an instruction that may not, in fact, need to have been executed. Thus, instructions moved from after a 'branch' instruction, or any instruction which conditionally changes the flow of instruction sequence, to before the decision point is referred to as a 'speculative' instruction. If, in fact, the branch is taken, and the flow of instructions is diverted, then the 'speculative' instruction is said to be 'mispredicted'.

The modifications made by mispredicted instructions may be ignored. However, sometimes a mispredicted instruction may trigger an exception. An exception may occur for many reasons; perhaps due to an overflow, underflow, or an operation on invalid data. In addition, many other types of errors may result in exceptions, though an entire listing of these events need not be described herein. Suffice it to say that when an exception occurs, the execution of the stream of instructions must be stopped and the exception condition corrected. Following correction of the instruction, the instruction stream may either be backed up to the instruction causing the exception, or redirected to a new instruction flow.

The above corrective measures are taken each time an exception occurs. However, if instructions are speculatively scheduled, and later found to be mispredicted, then the extensive exception correction measure outlined above need not have been taken. As a result, compute cycles are wasted on unnecessary operations and the performance of the application may be reduced instead of improved by speculative scheduling.

We perform a profiling pass in order to determine which instructions, when scheduled speculatively, cause exceptions. The scheduling algorithm for profiling is carefully chosen to expose as many exceptions as possible. This algorithm is different from the one a compiler would choose to maximize performance. For example, referring again to the above code sequence, assuming that the load information in instruction 1 is not available for 1 cycle, a 1 cycle stall would result between the execution of instructions 1 and 2. As shown, if the order of the code were rescheduled, instruction 3 could be moved above instruction 2 to fill the stall cycle. Execution of this rearranged code sequence may result in an exception caused by instruction 3. If instruction 3 causes an exception, the code could be recompiled, to force instruction 3 to follow the branch of instruction 2.

Because there is still a stall cycle to fill, on the second compilation pass, when instruction 3 is precluded from scheduling, the scheduler may move instruction 4 before the branch instruction 2. However, it may be that instruction 4 also causes an exception during execution. Therefore, a profiling run must be performed again before the new instruction scheduling is selected as the optimum scheduling. Thus it can be seen that an iterative process of scheduling, profiling, re-scheduling and re-profiling will be performed before the optimum scheduling is determined. This iterative process is time consuming and results in an undesirably long compilation period.

Thus it can be seen that it would be desirable to find all exception causing instructions in a single profiling execution of the compiled application. The present invention achieves this objective by performing the initial compile of the application using a 'maximum speculation' mode. Using maximum speculation, every instruction is forced to be speculatively executed. That is, every instruction is moved before as many preceding branches in the code sequence as possible. As a result, the maximum :number of instructions that may cause exceptions may be detected during one sample run of the application using the re-arranged code sequence. The exception characteristics of the instructions may then be fed: back for one, second pass, recompile to provide an optimally scheduled instruction sequence.

For example, referring now to FIG. 3C, an example of the code sequence above being rearranged for maximum speculation is shown as instruction sequence 28. Note that in this sequence, both instructions 3 and 4 have been moved before the branch instruction 2. Thus, by performing a sample run of the application in this rearranged code sequence, it can be detected whether both instructions 3 and 4 are likely to cause exceptions if they are speculatively scheduled.

Figure 2A:
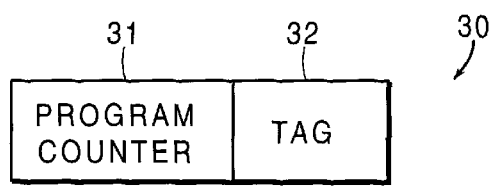
FIG. 2A illustrates a typical entry in a translation table of FIG. 1.

Once the instructions likely to cause exceptions have been detected, the method, according to this invention, reduces the occurrence of speculative exceptions by identifying those instructions most likely to cause exceptions, and precluding the re-scheduling of those instructions. Referring again to FIG. 1, upon completion of the initial compilation process, the compiler 16 outputs an executable file 25, representing the optimized application in scheduled, instruction set format. In addition, the compiler outputs a translation table 20. The translation table 20 includes an entry for each instruction. An example of a translation table entry 30 is shown in FIG. 2A to include a program counter 31 and a tag 32. As mentioned previously, the program counter indicates the location, in memory of the instruction in the executable program. The tag is a pointer to where the instruction ended up in the internal representation of the compiled program. Alternatively, the tag could be the location of the instruction in the source code.

When the application is compiled, the application program first output from the compiler 16 has many speculative instructions. Some of these speculative instructions will always cause exceptions due to the order of instructions in the new, rearranged instruction sequence.

To determine which instructions will cause exceptions, the method according to this invention executes the application program using a number of representative data sets 21 to provide profile information about the application. The data sets are designed such that execution using these data sets will identify exceptions. The data sets should be representative of the way the application program is used and are generally selected by the application programmer.

During the profiling phase, the program counters of each of the instructions that cause exceptions are recorded in a PC log file 23, and a count of the exceptions associated with each program counter is maintained. The PC log file 23 is actually a data structure stored in memory, where each entry of the data structure includes a program counter and a count. Each time an exception occurs, the PC log file 23 is searched for the appropriate program counter, and the counter corresponding to the program counter is updated. A hash table is maintained to locate the appropriate program counter in the PC log file, although other methods, known to those of skill in the art, may also be used. A separate PC log is generated for each data set. When all the representative data sets have been executed, the PC logs for each data set are merged to provide one large data structure PC Log 23 including the program counters that caused the exceptions during the profiling run, and the corresponding number of exceptions caused by each PC.

Figure 2B:
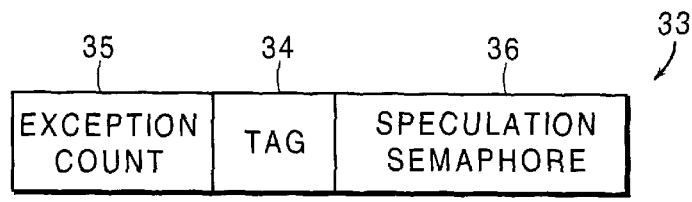
FIG. 2B illustrates a typical entry in a speculation table of the compiler of FIG. 1.

After the PC logs have been merged, the speculation table 19 is then addressed using the program counters in the PC Log 23 to cross reference the translation table 20 to provide the appropriate instruction tags. The number of exceptions caused by each instruction in the profiling run are stored in the speculation table with the corresponding instruction tag An example entry in the speculation table is shown in FIG. 2B to include a TAG field 34 an Exception Count 35, and Speculation Semaphore 36.

The Exception count 35 is used to set the Speculation Semaphore as follows. The Exception count 35 is examined to determine whether that instruction cause a sufficient number of exceptions to cause it to be precluded from scheduling. In determining which instructions are 'ideal' candidates for speculative scheduling, a tradeoff is made between the number of cycles required for the exception handler, and the number of cycles saved by speculative execution of the instruction. For example, if a program were to run for a long time and an instruction that is frequently executed only caused a few exceptions, it might still be worthwhile to schedule the instruction speculatively even if the exception handler uses a large number of cycles. For example, if scheduling an instruction speculatively helped you save 100,000 cycles, but the speculative exceptions cost you 10,000 cycles (2 exceptions at 5000 cycles each), then speculation for that instruction might be worthwhile.

Accordingly, because the present invention uses maximum speculation to force all of the instructions to be executed speculatively, the ideal and non-ideal candidates for speculative scheduling may be identified with only one pass of the compiler. As a result, the optimal solution, in terms of which instructions are rescheduled and which are not, may be provided with a minimum amount of excess compilation compute time.

The method used by the present invention to determine which instructions are 'ideal' is by comparing the exception count against a threshold value. A threshold number indicates the number of exceptions which are allowable for each instruction. If the threshold number is exceeded, speculative scheduling of the associated instruction is precluded by setting the associated Speculation Semaphore to a '1'. Note that overstepping the threshold value does not preclude any scheduling of the corresponding instruction, it simply precludes speculative scheduling.

During the second pass of the compiler, each of the instructions with the Speculative Semaphore 36 set will not be speculatively scheduled by the scheduler 16b, and accordingly an executable program is provided that has a reduced risk of speculative exceptions.

It should be noted that, although the above sequence describes separate translation tables, speculation tables, semaphores and PC logs, that all of the tables and/or logs are data structures which may be stored in any configuration in memory and the present invention is not meant to be limited to this configuration. For example, one data structure may be maintained that includes all of the above listed information, or separate data structures may be maintained for each. The selection of which arrangement is to be used is largely a design choice.

While maximum speculation alleviates the problems associated with 'mispredicted' exceptions resulting from instruction sequence, exceptions may also result when a re-scheduled instruction is executed before its associated data is initialized. For example a problem may arise if scheduling affects the initialization of variables in a sequence of code. The effects of this problem can be shown through the use of the following code sequence:

1. if (float)
2. f=1.0;
3. else
4. I=1;
5. if (float)
6. f=-f;

In a program that has not been rearranged by speculation, the variable 'f' is always initialized before the negate operation in instruction 6. However, if the scheduler moves instruction 6 before the initial test is performed by instruction 5, then variable 'f' may be uninitialized when the negate operation is executed.

To overcome this problem, during the profiling portion of the initial compilation, each variable is initialized to a special, known value through the use of an initialization code segment appended to the start of every function. The initialization value is selected such that it will always generate an exception if it is used in an operation that may raise an exception. The selection of the value is machine dependent. For example, because the present invention was developed to work in an Alpha™ system, a value used for initialization was a '1', because '1' is an unaligned address and a denormalized floating point value, both of which cause exceptions in an Alpha™ computer.

In addition, the optimization process, which frequently copies instructions, may generate an instruction sequence likely to cause exceptions. For example, while obtaining profile data for the application, one of the copies of the instruction may cause a greater number of exceptions than the other copies, and that copy will be flagged for non-speculative scheduling. During the second compilation process, those instructions having incurred the exceptions will not be speculatively scheduled, but other copies of the instructions may still be scheduled during the optimization phase of the second compilation process if they incurred less than the allowable threshold of exceptions. The copies, being exact replicas of the instruction causing the exceptions will likely cause a similar amount of exceptions even though they did not incur the threshold amount of exceptions during the initial profiling run.

Speculative scheduling of copies of non-speculatively scheduled instructions is precluded during the second compilation process as follows. During the translation process of the second compilation, the TAGS and program counters are encountered as during the first compilation process. During the optimization phase, whenever an instruction is copied, a corresponding speculation table entry is formed by copying the speculation table entry of the original instruction. As a result, the exception characteristics of the copied instructions will be identical to those of the original instruction. Therefore, during the scheduling process, all copies of an original instruction that is precluded from speculative scheduling will also be precluded from speculative scheduling.

Figure 4:
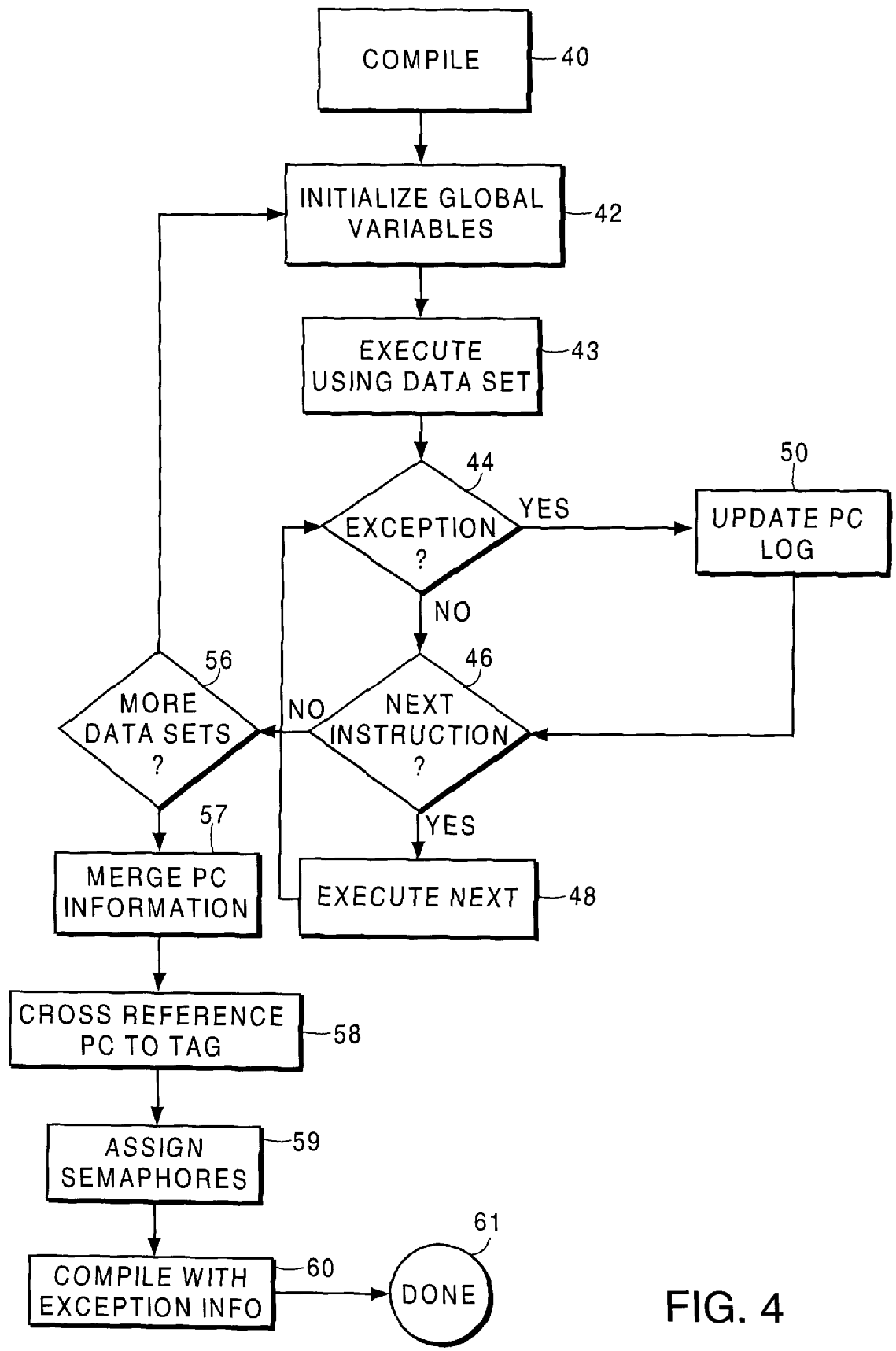
FIG. 4 is a flow diagram illustrating the execution process of the compiler of FIG. 1.

Referring now to FIG. 4, a flow diagram illustrating the overall operation of the invention described above is shown. At step 40, the application program is compiled using the special compilation mode, where the highest number of instructions are executed speculatively. As instructions are translated they are assigned tags. After compilation is finished, and the program counters are known, a the translation table is updated similar to that shown below in TABLE 1:

TABLE 1

Translation Table Entries

| PC | TAG |
|---|---|
| 100 | 2 |
| 101 | 3 |
| 102 | 4 |

At step 42, all of the variables are initialized to a known state which is sure to cause an exception if the variable is operated on without prior initialization. As mentioned previously, this initialization is performed by inserting a code segment onto the beginning of the application and at the beginning of each function during compilation. At step 43, the compiled application program is repeatedly executed using a variety of known data sets. During the execution, at step 44, it is determined whether each instruction has caused an exception. If, at step 44 it is determined that there is no exception, it is determined at step 46 if there are more instructions to be executed. If, at step 44 there is an exception, at step 50 the entry in the PC LOG associated with the program counter of the instruction causing the exception is incremented. It is then determined at step 46 if there are any more instructions in the sequence. If there are more instructions, the process continues to test for exceptions and increment counters in the PC LOG file as appropriate.

If, at step 46, it is determined that there are no more instructions, it is determined at step 56 if there are any more data sets to test. If there are more data sets, the above described process is repeated until the entire test set is exhausted. Once the application has been tested using all of the data sets, at step 57 the PC Logs are merged. The result is a PC Log such as that shown below in TABLE 2.

TABLE 2

PC Log

| PC | # OF EXCEPTIONS |
|---|---|
| 102 | 30 |

At step 58, the PC log (Table 2) is used in conjunction with the tag table (Table 1) to generate a speculation table (Table 3), by cross-referencing the PC's in the PC log with the TAGs in the tag table. The speculation table includes information about the TAG of the instruction and the exception characteristics of the instruction. At step 59, the exception characteristics are analyzed to determine whether or not they exceed some threshold value. This threshold is determined based upon the number of cycles required for an exception handler versus the number of cycles saved by the speculative scheduling of the instruction. A threshold value of 1 was used in the preferred embodiment of the invention, although other values could be used for systems capable of providing exception handling with a minimum number of cycles. As a result, a semaphore associated with the instruction is set to indicate whether or not the instruction should be speculatively scheduled. Table 3 illustrates a sample Speculation Table entry including the semaphore.

TABLE 3

Speculation Table Tag and speculation semaphore

| TAG | Exception Count | Semaphore |
|---|---|---|
| 2 | 0 | |
| 3 | 0 | |
| 4 | 30 | non-speculative |
| 5 | 0 | |

After the semaphores for each instruction have been determined, at step 60 the second compilation process begins. During the optimization phase of the second compilation, any instructions that are copied from an original instruction will also have a speculation table entry created by copying the speculation table entry of the original instruction. The scheduler schedules the instruction sequence such that those instructions likely to cause speculative execeptions are not executed speculatively. Upon completion of execution by the scheduler, an application is provided that may use the resources of the associated computer system more efficiently.

Thus a method has been provided that reduces the problem of exceptions caused by mispredicted speculative instructions. The method ensures that exceptions caused both by uninitialized data and exceptions caused by instruction sequence are detected and eliminated from the application.

Having described the preferred embodiments of the invention, it will now become apparent to those of ordinary skill in the art that other embodiments incorporating its concepts may be provided. It is felt therefore that this invention should not be limited to the disclosed embodiments, but rather should be limited only by the spirit and scope of the claims.

What we claim is:

1. A method comprising the steps of:
   compiling source code into an executable application comprising a plurality of instructions in an order of maximum speculation;
   executing said executable application based on a plurality of data sets and storing exception characteristics of each instruction; and
   recompiling said source code using said stored exception characteristics to determine a portion of said plurality of instructions which should not be speculatively scheduled.

2. The method according to claim 1, wherein the source code includes the plurality of instructions having a first order, and wherein said step of compiling comprises the step of providing the executable application having the plurality of instructions in a second order that is different than the first order, the second order having each non-branch instruction of the plurality of instructions moved before as many branch instructions as possible relative to the first order.

3. The method according to claim 1, wherein said step of recompiling further comprises the step of selecting instructions of said source code for reordering, said instructions selected for re-ordering responsive to said associated exception characteristics of said instruction.

4. The method according to claim 3, further comprising the step of providing a speculation table having an entry for each of said instructions, said entry for storing said exception characteristics of said instruction.

5. The method according to claim 4, wherein each entry of said speculation table further comprises a semaphore for indicating whether said instruction may be scheduled speculatively by said recompile step.

6. The method according to claim 5, wherein said semaphore is set during said profiling step responsive to said exception characteristics exceeding a threshold.

7. The method according to claim 4, wherein said source code further comprises a stream of instructions, and wherein the step of recompiling further comprises the step of optimizing said stream of instructions to provide improved performance of said executable application.

8. The method according to claim 7, wherein said optimizing step further comprises the steps of:
   replicating one of said instructions; and
   when replicating said one of said instructions, additionally replicating said exception characteristics corresponding to said one of said instructions.

9. The method according to claim 1, wherein the plurality of instructions includes a first set of initialization instructions that initializes variables used during execution of the executable application, and wherein the method further comprises the step of:
   adding a second set of initialization instructions to said executable application,
   said second set of initialization instructions initializing said variables used during execution of said executable application.

10. The method according to step 9, wherein said second set of initialization instructions initialize the variables in an attempt to cause exceptions during execution of said executable application.

11. The method of claim 1, wherein the step of executing and storing includes the step of generating an exception log for each of the plurality of data sets, and wherein the method further comprises the step of:
    merging the exception log for each of the plurality of data sets to form a merged log having aggregate exception counts for each of the plurality of instructions of the executable application.

12. The method of claim 11, further comprising the step of:
    comparing the aggregate exception counts of the merged log to a predetermined threshold to identify instructions of the source code for non-speculative scheduling.

13. The method of claim 12, wherein the step of recompiling includes the step of:
    speculatively scheduling an instruction that causes an exception when an aggregate exception count associated with that instruction is less than the predetermined threshold.

14. The method of claim 1, wherein a first instruction precedes a second instruction in program order within the source code, wherein the first instruction initializes a particular variable and the second instruction uses the particular variable, and wherein the step of compiling includes the step of:
    ordering the second instruction ahead of the first instruction within the executable application.

15. An apparatus comprising:
    a memory that stores source code;
    a processor coupled to said memory;
    a compiler program, stored in said memory, for compiling the source code into an executable application when the compiler program is executed by the processor, said compiler program including:
        a translation unit for translating the source code stored in said memory into a translated program comprising a stream of instructions;
        an optimization unit for optimizing said translated program to provide enhanced performance of said processor;
        a scheduler unit for rearranging said stream of instructions in an order of maximum speculation upon an initial compile of the source code; and
    means for providing a speculation table, said speculation table comprising a plurality of entries corresponding to said stream of instructions, each entry for storing exception characteristics of said associated instruction, said exception characteristics used by said compiler program to determine a portion of said stream of instructions which should not be speculatively scheduled upon retranslation of said stream of instructions.

16. The apparatus of claim 15 wherein said compiler program further comprises:
    means, responsive to said speculation table, for providing a recompiled application for execution on said processor.

17. The apparatus of claim 16, further comprising:
    means for generating a log file, stored in memory, for storing profile information incurred by executing said executable application using a variety of data sets, wherein said log file includes a plurality of program counters of instructions in said executable application and a count associated with each of said program counters, said count indicating the number of exceptions incurred during execution of said executable application using said data sets.

18. The apparatus of claim 17, further comprising:

means for cross-referencing said program counters in said log file against a tag of each of said instructions; and means for updating said exception characteristics of each instruction of said speculation table responsive to said cross-referencing means and responsive to said log file.

19. The apparatus of claim 15, wherein the stream of instructions includes a first set of initialization instructions that initializes variables used during execution of the executable application, and wherein said compiler further comprises:

initialization means for adding a second set of initialization instructions to said executable application said second set of initialization instructions initializing said variables used during execution of said executable application.

20. The apparatus of claim 19, wherein said second set of initialization instructions initialize the variables in an attempt to cause exceptions during execution of said executable application.

21. The apparatus of claim 15, further comprising:

exception log generation code that, when executed by the processor, generates an exception log for each of the plurality of data sets; and merge code that, when executed by the processor, merges the exception log for each of the plurality of data sets to form a merged log having aggregate exception counts for each of the plurality of instructions of the executable application.

22. The apparatus of claim 21, further comprising:

compare code that, when executed by the processor, compares the aggregate exception counts of the merged log to a predetermined threshold to identify instructions of the source code for non-speculative scheduling.

23. The apparatus of claim 22, wherein, during a recompile of the source code, the compiler is adapted to speculatively schedule an instruction that causes an exception when an aggregate exception count associated with that instruction is less than the predetermined threshold.

24. The apparatus of claim 15, wherein a first instruction precedes a second instruction in program order within the source code, wherein the first instruction initializes a particular variable and the second instruction uses the particular variable, and wherein the compiler is adapted to order the second instruction ahead of the first instruction within the executable application during an initial compile of the source code.

25. The apparatus of claim 15 wherein said scheduler unit further comprises:

means for rearranging said instructions such that all of said instructions are moved before preceding branches.

26. The apparatus of claim 15 wherein said scheduler unit further comprises:

means for precluding rearrangement of instructions having undesirable exception characteristics.

* * * * *